US010212166B2

United States Patent
Xie et al.

(10) Patent No.: US 10,212,166 B2
(45) Date of Patent: Feb. 19, 2019

(54) FILE DOWNLOADING METHOD, APPARATUS, AND SYSTEM

(71) Applicant: Huawei Technologies Co., Ltd., Shenzhen, Guangdong (CN)

(72) Inventors: Qingdong Xie, Shenzhen (CN); Kaifu Xu, Shenzhen (CN); Xiaoming Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 159 days.

(21) Appl. No.: 15/128,614

(22) PCT Filed: Mar. 24, 2014

(86) PCT No.: PCT/CN2014/073931
§ 371 (c)(1),
(2) Date: Sep. 23, 2016

(87) PCT Pub. No.: WO2015/143596
PCT Pub. Date: Oct. 1, 2015

(65) Prior Publication Data
US 2017/0111362 A1    Apr. 20, 2017

(51) Int. Cl.
*H04L 29/06* (2006.01)
*H04L 9/32* (2006.01)
(Continued)

(52) U.S. Cl.
CPC .......... *H04L 63/101* (2013.01); *G06F 21/33* (2013.01); *G06F 21/335* (2013.01);
(Continued)

(58) Field of Classification Search
None
See application file for complete search history.

(56) References Cited

U.S. PATENT DOCUMENTS

2011/0258326 A1   10/2011   Hu et al.
2013/0212707 A1*   8/2013   Donahue ............ G06F 21/6218
                                                          726/29

FOREIGN PATENT DOCUMENTS

CN    1801824 A    7/2006
CN    1859115 A   11/2006
(Continued)

OTHER PUBLICATIONS

Xiaomin, Luo, "Anti-hotlinking technology for Mobile Streaming Media Service," A Dissertation Submitted for the Degree of Master, South China University of Technology, Guangzhou, China, 64 pages.
(Continued)

*Primary Examiner* — Brandon S Hoffman

(57) ABSTRACT

The present invention discloses a file downloading method, a server, a download access node, and a distributed storage system, which pertains to the field of communications technologies, and is designed to resolve a problem in the prior art that load on the server increases, and an authentication speed and a response speed for downloading a file are reduced. The file downloading method includes: acquiring, by a server, download permission that is set, and generating an access control list parameter of the download permission; and releasing, by the server, a download link that includes the access control list parameter, so that a terminal acquires the download link and generates a download request that includes the access control list parameter.

16 Claims, 11 Drawing Sheets

(51) Int. Cl.
*H04L 29/08* (2006.01)
*G06F 21/33* (2013.01)
*G06F 21/62* (2013.01)

(52) U.S. Cl.
CPC ........ *G06F 21/6218* (2013.01); *H04L 9/3236* (2013.01); *H04L 67/06* (2013.01); *G06F 2221/2141* (2013.01)

(56) References Cited

FOREIGN PATENT DOCUMENTS

| | | | |
|---|---|---|---|
| CN | 1909557 | A | 2/2007 |
| CN | 101247409 | A | 8/2008 |
| CN | 201256399 | Y | 6/2009 |
| CN | 101800985 | A | 8/2010 |
| CN | 101815061 | A | 8/2010 |
| CN | 102045348 | A | 5/2011 |
| CN | 102055752 | A | 5/2011 |
| CN | 102111750 | A | 6/2011 |
| CN | 102118323 | A | 7/2011 |
| CN | 102263828 | A | 11/2011 |
| CN | 102523495 | A | 6/2012 |
| CN | 102624752 | A | 8/2012 |
| CN | 102752300 | A | 10/2012 |
| CN | 103067409 | A | 4/2013 |
| CN | 103248680 | A | 8/2013 |
| CN | 103248695 | A | 8/2013 |

OTHER PUBLICATIONS

"Research and Implementation of Website Picture Anti-Hotlinking Technology," Abstract, 53 pages.

* cited by examiner

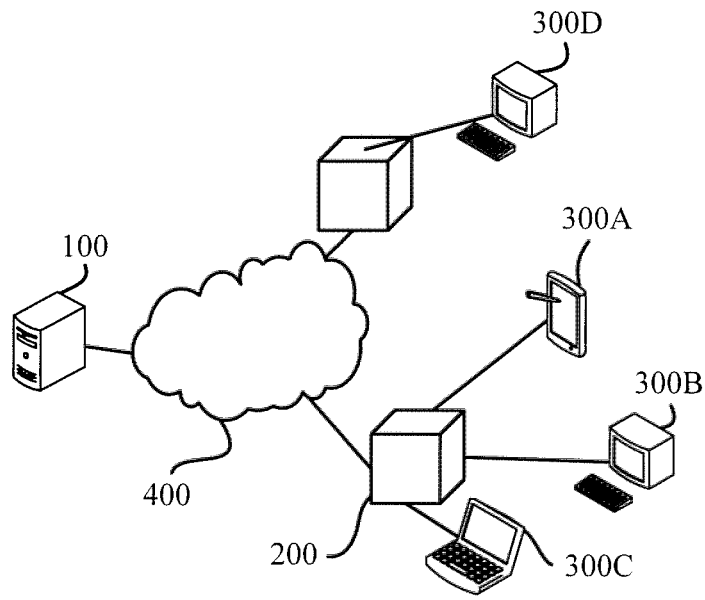

FIG. 1

S100. A server acquires download permission that is set, and generates an access control list parameter of the download permission S110. The server releases a download link that includes the access control list parameter, so that a terminal acquires the download link and generates a download request that includes the access control list parameter

FIG. 2

S111. A server receives a download link acquiring request from a terminal

S112. The server sends a download link to the terminal

FIG. 3

FILE DOWNLOADING METHOD, APPARATUS, AND SYSTEM

CROSS REFERENCE TO RELATED APPLICATIONS

The present application claims priority under 35 U.S.C. § 365 to International Patent Application No. PCT/CN2014/073931 filed Mar. 24, 2014 which is incorporated herein by reference into the present disclosure as if fully set forth herein.

TECHNICAL FIELD

The present invention pertains to the field of communications technologies, and in particular, to a file downloading method, a server, a download access node, and a distributed storage system.

BACKGROUND

With increasing popularity of an Internet communications technology, various distributed storage systems, such as a web disk and a cloud storage system, are gradually used by more users. In a distributed storage system, a bandwidth resource and a server resource are limited. How to better protect a benefit of a developer of a distributed storage system and how to create good user experience for a user are considered hot issues. Downloading a file from the distributed storage system by a terminal is limited by using access permission so as to implement a function of link theft prevention; for example, conditions, such as a requesting source of a download request, a client, an IP (Internet Protocol, Internet Protocol) segment, and a download validity period may be determined to avoid link theft.

In the prior art, download permission is stored in a server. When a file is being downloaded, a download access node needs to send a download request to the server so that authentication is performed by the server, or a download access node needs to request the download permission from the server so as to complete authentication. In this case, in an authentication process, not only load on the server increases, but also an authentication speed and a response speed for downloading a file are reduced.

SUMMARY

Embodiments of the present invention provide a file downloading method, a server, a download access node, and a distributed storage system, which can reduce load on the server, and increases an authentication speed and a response speed for downloading a file.

To achieve the foregoing objective, the embodiments of the present invention use the following technical solutions:

According to a first aspect, the present invention provides a file downloading method, including:

acquiring, by a server, download permission that is set, and generating an access control list parameter of the download permission; and releasing, by the server, a download link that includes the access control list parameter, so that a terminal acquires the download link and generates a download request that includes the access control list parameter.

With reference to the first aspect of the present invention, in a first possible implementation manner of the first aspect of the present invention, before the acquiring, by a server, download permission that is set, and generating an access control list parameter of the download permission, the method further includes:

acquiring, by the server, a file parameter of an uploaded file, and generating an original download link of the uploaded file; and the acquiring, by a server, download permission that is set, and generating an access control list parameter of the download permission includes:

acquiring, by the server, the download permission that is set;

generating, by the server, an access control list according to the download permission;

encrypting, by the server, the access control list according to a first key agreed on with a download access node, and forming the access control list parameter; and performing, by the server, a hash operation on the original download link, the access control list parameter, and a second key agreed on with the download access node, and generating a hash value, where the hash value and the original download link are included in the download link.

With reference to the first possible implementation manner of the first aspect of the present invention, in a second possible implementation manner of the first aspect of the present invention, the access control list includes at least one control entry, the access control list parameter includes at least one control entry parameter, and one control entry parameter is corresponding to one control entry; and the control entry parameter is formed after the control key is encrypted according to the first key.

With reference to the first possible implementation manner of the first aspect of the present invention, in a third possible implementation manner of the first aspect of the present invention, the method further includes:

when a preset time threshold expires, negotiating, by the server, with the download access node, and updating the first key and the second key.

With reference to the first possible implementation manner of the first aspect of the present invention, in a fourth possible implementation manner of the first aspect of the present invention, before the acquiring, by the server, a file parameter of an uploaded file, and generating an original download link of the uploaded file, the method further includes:

acquiring, by the server, user information used when a file is uploaded; and according to the user information, negotiating, by the server, with the download access node, and generating at least one of the first key and the second key for a user.

With reference to the first aspect of the present invention or any possible implementation manner of the foregoing first aspect, in a fifth possible implementation manner of the first aspect of the present invention, the releasing, by the server, a download link that includes the access control list parameter includes:

receiving, by the server, a download link acquiring request from the terminal; and sending, by the server, the download link to the terminal.

According to a second aspect, the present invention provides a file downloading method, including:

receiving, by a download access node, a download request that is initiated by a terminal according to a download link released by a server, where the download link includes an access control list parameter generated by the server according to download permission that is set, and the download request includes the access control list parameter and a download parameter of the terminal;

performing, by the download access node, authentication on the download request according to the access control list parameter and the download parameter; and sending, by the download access node, an authentication result to the terminal.

With reference to the second aspect, in a first possible implementation manner of the second aspect of the present invention, the performing, by the download access node, authentication on the download request according to the access control list parameter and the download parameter includes:

checking, by the download access node, integrity of an original download link, the access control list parameter, and a second key according to a hash value, where the original download link is generated by the server according to a file parameter of an uploaded file, and the hash value is generated by the server by performing a hash operation on the original download link, the access control list parameter, and the second key;

when it is determined, according to the second key, that at least one of the original download link, the access control list parameter, and the second key is modified, notifying, by the download access node, the terminal that downloading cannot be performed; or when it is determined, according to the second key, that none of the original download link, the access control list parameter, and the second key is modified, decrypting, by the download access node, the access control list parameter according to a first key agreed on with the server, and obtaining an access control list by parsing; and performing, by the download access node, authentication on the download request by using the access control list and the download parameter.

With reference to the first possible implementation manner of the second aspect, in a second possible implementation manner of the second aspect of the present invention, the sending, by the download access node, an authentication result to the terminal includes:

when the download parameter does not meet download permission included in the access control list, notifying, by the download access node, the terminal that downloading of the uploaded file cannot be performed;

or when the download parameter meets download permission included in the access control list, sending, by the download access node to the terminal, the uploaded file identified by the original download link.

According to a third aspect, the present invention further provides a server applied to a distributed storage system, including:

a receiving unit, configured to acquire download permission that is set;

a generating unit, configured to generate an access control list parameter according to the download permission; and a sending unit, configured to release a download link that includes the access control list parameter, so that a terminal acquires the download link and generates a download request that includes the access control list parameter.

With reference to the third aspect, in a first possible implementation manner of the third aspect of the present invention, the receiving unit is further configured to acquire a file parameter of an uploaded file; and the generating unit includes:

a generating module, configured to generate an access control list according to the download permission, and generate an original download link of the uploaded file according to the file parameter of the uploaded file; and an encrypting module, configured to encrypt the access control list according to a first key agreed on with a download access node, and form the access control list parameter; and perform a hash operation on the original download link, the access control list parameter, and a second key agreed on with the download access node, and generate a hash value, where the hash value and the original download link are included in the download link.

With reference to the first possible implementation manner of the third aspect of the present invention, in a second possible implementation manner of the third aspect of the present invention, the access control list includes at least one control entry, the access control list parameter includes at least one control entry parameter, and one control entry parameter is corresponding to one control entry; and the control entry parameter is formed after reversible the control key is encrypted according to the first key.

With reference to the first possible implementation manner of the third aspect of the present invention, in a third possible implementation manner of the third aspect of the present invention, the server further includes a negotiating unit, where the negotiating unit is configured to: when a preset time threshold expires, negotiate with the download access node and update the first key and the second key.

With reference to the third possible implementation manner of the third aspect of the present invention, in a fourth possible implementation manner of the third aspect of the present invention, the receiving unit is further configured to acquire user information used when a file is uploaded; and the negotiating unit is further configured to according to the user information, negotiate with the download access node and generate at least one of the first key and the second key for a user.

With reference to the third aspect of the present invention or any possible implementation manner of the foregoing third aspect, in a fourth possible implementation manner of the third aspect of the present invention, the receiving unit is further configured to receive a download link acquiring request from the terminal; and the sending unit is specifically configured to send the download link to the terminal.

According to a fourth aspect, the present invention discloses a download access node applied to a distributed storage system, including:

a receiving unit, configured to receive a download request that is initiated by a terminal according to a download link released by a server, where the download link includes an access control list parameter generated by the server according to download permission that is set, and the download request includes the access control list parameter and a download parameter of the terminal;

an authentication unit, configured to perform authentication on the download request according to the access control list parameter and the download parameter; and a sending unit, configured to send an authentication result to the terminal.

With reference to the fourth aspect of the present invention, in a first possible implementation manner of the fourth aspect of the present invention, the authentication unit includes a decrypting module and an authentication module; where the decrypting module is configured to: check integrity of an original download link, the access control list parameter, and a second key according to a hash value, where the original download link is generated by the server according to a file parameter of an uploaded file, and the hash value is generated by the server by performing a hash operation on the original download link, the access control list parameter, and the second key; and decrypt the access control list parameter according to a first key agreed on with the server, and obtain an access control list by parsing; and the sending unit is further configured to: when it is determined, according to the second key, that at least one of the original download link, the access control list parameter, and the second key is modified, notify the terminal that downloading cannot be performed; or when it is determined, according to the second key, that none of the original download link, the access control list parameter, and the second key is modified, the download access node decrypts the access control list parameter according to the first key agreed on with the server, and obtains the access control list by parsing; and the authentication unit further includes:

the authentication module, configured to perform authentication on the download request by using the access control list and the download parameter.

With reference to the first possible implementation manner of the fourth aspect, in a second possible implementation manner of the fourth aspect of the present invention, the sending unit is further configured to: when the download parameter does not meet download permission included in the access control list, notify the terminal that downloading of the uploaded file cannot be performed; or when the download parameter meets download permission included in the access control list, send, to the terminal, the uploaded file identified by the original download link.

According to a fifth aspect, the present invention further provides a distributed storage system, including any one of the foregoing servers and any one of the foregoing download access nodes.

According to a sixth aspect, the present invention further provides a server applied to a distributed storage system, including a receiver, a processor, and a transmitter, where the receiver is configured to acquire download permission that is set;

the processor is configured to generate an access control list parameter according to the download permission; and the transmitter is configured to release a download link that includes the access control list parameter, so that a terminal acquires the download link and generates a download request that includes the access control list parameter.

With reference to the sixth aspect, in a first possible implementation manner of the sixth aspect of the present invention, the receiver is further configured to acquire a file parameter of an uploaded file; and the processor is specifically configured to: generate an access control list according to the download permission; generate an original download link of the file according to the file parameter of the uploaded file; encrypt the access control list according to a first key agreed on with a download access node, and form the access control list parameter; and perform a hash operation on the original download link, the access control list parameter, and a second key agreed on with the download access node, and generate a hash value, where the hash value and the original download link are included in the download link.

With reference to the first possible implementation manner of the sixth aspect, in a second possible implementation manner of the sixth aspect of the present invention, the access control list includes at least one control entry, the access control list parameter includes at least one control entry parameter, and one control entry parameter is corresponding to one control entry; and the control entry parameter is formed after the control key is encrypted according to the first key.

With reference to the first possible implementation manner of the sixth aspect, in a third possible implementation manner of the sixth aspect of the present invention, the processor is further configured to: when a preset time threshold expires, negotiate with the download access node by using the transmitter and the receiver, and update the first key and the second key.

With reference to the third possible implementation manner of the sixth aspect, in a fourth possible implementation manner of the sixth aspect of the present invention, the receiver is further configured to acquire user information used when a file is uploaded; and the processor is further configured to according to the user information, negotiate with the download access node by using the transmitter and the receiver, and generate, at least one of the first key and the second key for a user.

With reference to the sixth aspect or any possible implementation manner of the sixth aspect, in a fifth possible implementation manner of the sixth aspect of the present invention, the receiver is further configured to receive a download link acquiring request from the terminal; and the transmitter is specifically configured to send the download link to the terminal.

According to a seventh aspect, the present invention further provides a download access node applied to a distributed storage system, including a receiver, a processor, and a transmitter, where the receiver is configured to receive a download request that is initiated by a terminal according to a download link released by a server, where the download link includes an access control list parameter generated by the server according to download permission that is set, and the download request includes the access control list parameter and a download parameter of the terminal;

the processor is configured to perform authentication on the download request according to the access control list parameter and the download parameter; and the transmitter is configured to send an authentication result to the terminal.

With reference to the seventh aspect of the present invention, in a first possible implementation manner of the seventh aspect of the present invention, the processor is specifically configured to: check integrity of an original download link, the access control list parameter, and a second key according to a hash value, where the original download link is generated by the server according to a file parameter of an uploaded file, and the hash value is generated by the server by performing a hash operation on the original download link, the access control list parameter, and the second key; and decrypt the access control list parameter according to a first key agreed on with the server, and obtain an access control list by parsing;

the transmitter is further configured to: when it is determined, according to the second key, that at least one of the original download link, the access control list parameter, and the second key is modified, notify the terminal that downloading cannot be performed; or when it is determined, according to the second key, that none of the original download link, the access control list parameter, and the second key is modified, the download access node decrypts the access control list parameter according to the first key agreed on with the server, and obtains the access control list by parsing; and the processor is further configured to perform authentication on the download request by using the access control list and the download parameter.

With reference to the first possible implementation manner of the seventh aspect of the present invention, in a second possible implementation manner of the seventh aspect of the present invention, the transmitter is further configured to: when the download parameter does not meet download permission included in the access control list, notify the terminal that downloading of the uploaded file cannot be performed; or when the download parameter meets download permission included in the access control list, send, to the terminal, the uploaded file identified by the original download link.

The present invention discloses a file downloading method, a server, a download access node, and a distributed storage system. The server generates an access control list parameter that limits download permission, and publishes the access permission control list parameter together with a download link; and when a terminal sends a download request to the download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of a structure of a distributed storage system according to the present invention;

FIG. 2 is a flowchart of a file downloading method of a server according to the present invention;

FIG. 3 is a flowchart of another file downloading method of a server according to the present invention;

DETAILED DESCRIPTION

Figure 4:
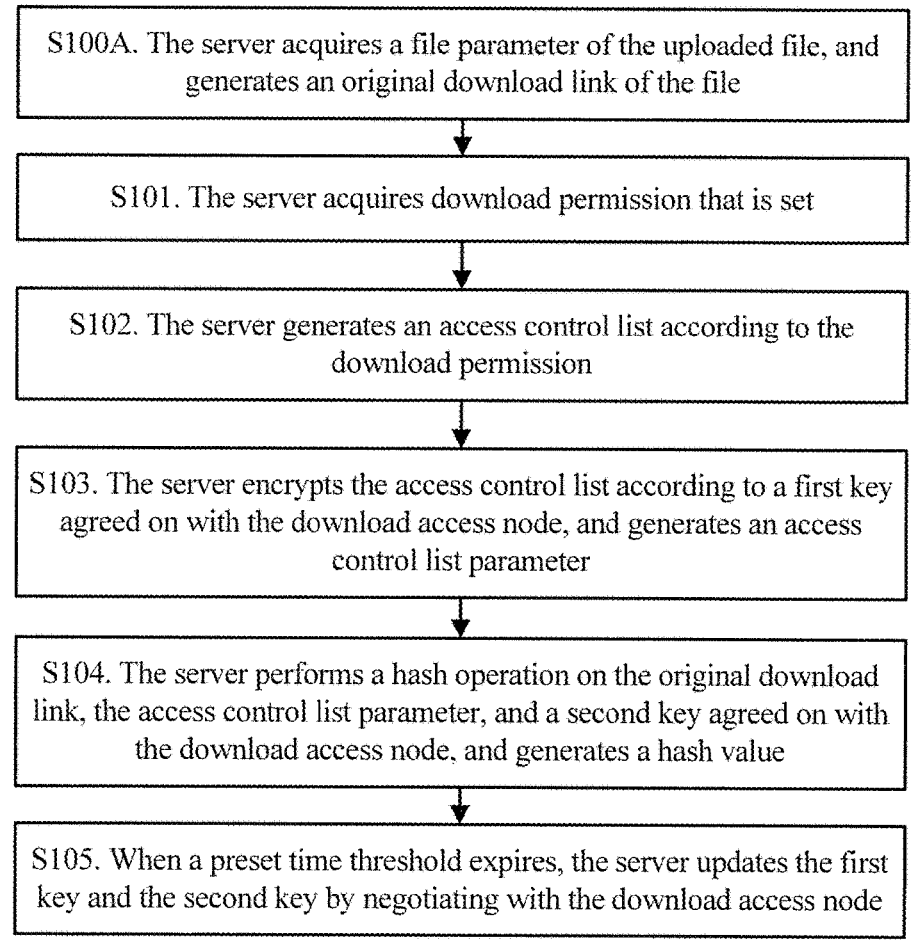
FIG. 4 is a flowchart of another file downloading method of a server according to the present invention.

With reference to accompanying drawings, the following describes in detail a file downloading method, a server, a download access node, and a distributed storage system that are provided in embodiments of the present invention.

It should be clear that the described embodiments are merely some but not all of the embodiments of the present invention. All other embodiments obtained by a person of ordinary skill in the art based on the embodiments of the present invention without creative efforts shall fall within the protection scope of the present invention.

The present invention provides a file downloading method, which is applied to a distributed storage system. The distributed storage system 1, such as a web disk or a cloud storage system, includes a server 100 and a download access node 200, as shown in FIG. 1. The server 100 is connected to the download access node 200 by using a wide area network 400, and the download access node 200 is connected to a terminal 300. It should be noted that, the server 100 is connected, by using the wide area network 400, to the download access node 200 distributed relatively near the terminal 300 of a user; the download access node 200 may be separately connected to multiple terminals 300 and separately receive and forward packets of the terminals 300; the download access node 200 may be a self-constructed boundary node, or may be a purchased CDN. A boundary node and a CDN may receive and forward a data packet, and may also provide file downloading. Generally, the distributed storage system 1 further includes a cache server (not shown in the figure) used to store a file, so that a user may acquire, from the cache server, a file that needs to be downloaded; and the cache server may be considered as a device that is the same as the download access node 200. Generally, there are multiple download access nodes 200 and they are disposed in various places, so that the user can easily find and access a node. In addition, the terminal 300 may be a tablet computer 300A, a personal computer 300B, a laptop 300C, or the like, and a type of the terminal 300 is not limited herein.

When a user needs to upload a file to the distributed storage system 1, the user needs to first access the distributed storage system 1 by using a client installed on the terminal 300 or by using a browser, and then upload the to-be-uploaded file that needs to be stored and shared to the distributed storage system 1.

The terminal establishes a connection to the download access node 200, and uploads the file to the download access node 200. The device stores the file uploaded by the user, and the server 100 generates an original download link for storing the file, where the original download link is used to identify a location at which the file is located. After uploading of the file is completed, the user may set a range within which downloading of the file is allowed, that is, the user sets download permission, where the download permission includes a blacklist and whitelist of a requesting source, a blacklist and whitelist of a client, a blacklist and whitelist of an IP segment, a validity period during which download is permitted, and the like. However, the permission mentioned above may only serve as partial content of the download permission, and the user may further set another type of download permission according to different needs, which is not limited herein.

An embodiment of a file downloading method provided in the present invention is described by using an example in which the method is applied to a server 100. Referring to FIG. 2, the file downloading method includes the following steps:

S100. The server acquires download permission that is set, and generates an access control list parameter of the download permission.

The server 100 generates and stores an access control list of the download permission according to user's setting, and the access control list includes a blacklist and whitelist of a requesting source, a blacklist and whitelist of a client, a blacklist and whitelist of an IP segment, a validity period for downloading, and the like that are set in the foregoing download permission.

S110. The server releases a download link that includes the access control list parameter, so that a terminal acquires the download link and generates a download request that includes the access control list parameter, and the download access node receives the initiated download request, performs authentication on the download request according to a download parameter of the terminal and the access control list parameter, and sends an authentication result to the terminal.

After generating the access control list of the download permission, the server 100 performs transcoding on the access control list, so as to form the access control list parameter. The server 100 attaches the access control list parameter to the download link for releasing. The releasing described herein may be: the server 100 directly sends the download link to the terminal, so that the download link can be displayed on a page of a browser on the terminal and released on the Internet by the user; or after a client on the terminal sends a download link acquiring request to the server 100, the server 100 sends the download link to the terminal according to the download link acquiring request.

The download link received by the terminal includes an original download link that identifies a location of a file that needs to be downloaded, the access control list parameter that limits the download permission, and other information; for example, the download link received by the terminal may further include the hash value described in the following. A download request for a file is generated according to the download link, and the download request includes at least the original download link and the access control list parameter, or may further include the hash value described in the following.

After receiving the download request from the terminal, the download access node 200 parses the download request, so as to obtain the access control list parameter of the download request; after an operation, such as transcoding, is performed on the access control list parameter, acquires the access control list that includes information about the download permission, and acquires the download parameter of the terminal from the download request, where the download parameter includes information such as requesting source information, client information, an IP segment, and a request time; and compares the download parameter with information in the access control list so as to determine whether the download request meets the download permission that is set.

Optionally, referring to FIG. 3, the releasing, by the server, a download link that includes the access control list parameter includes the following steps:

S111. The server receives a download link acquiring request from the terminal.

S112. The server sends the download link to the terminal.

When the user sets upload permission and download permission by using the client on the terminal, the user does not need to publish the original download link or a final download link on the Internet, and needs only to upload an uploaded file and set the download permission. In this case, the server 100 automatically generates a download entry of the distributed storage system 1. When another user selects the download entry by using a client, the client initiates a download link acquiring request to the server 100, so as to acquire an original download link that is needed for completing downloading a file, or the original download link, the access control list parameter, and the hash value.

When the another user initiates a download link acquiring request to the server 100 by using the client, different processing is performed in different manners.

When the another user operates the client installed on the terminal 300 to perform downloading, and the server 100 receives a download link acquiring request for downloading the file, the server 100 sends the original download link and the access control list parameter to the terminal 300 according to the download link acquiring request. In this case, when the another user requests to download a file, the client performs download requesting according to the original download link and the access control list parameter that are acquired.

In this case, because the client may customize a download request in an HTTP protocol (HTTP-Hypertext transfer protocol, Hypertext Transfer Protocol) according to the HTTP protocol, that is, an entry in the client may be set, according to a need, for storing the access control list parameter. When download requesting is performed, the acquired access control list parameter is loaded into an HTTP header that is based on the download request, and is sent to the download access node 200 for authentication.

To prevent a user that does not meet the download permission from learning the download permission, the access control list that includes the download permission needs to be encrypted. The encryption is implemented by using a key, and the key herein is formed by means of an agreement between the server 100 and the download access node 200. After the key is formed, the server 100 and the download access node 200 separately store the key. The key may be set according to an actual situation. One type of key is used to perform reversible encryption, and another type of key is used to perform a hash operation so as to acquire a hash value. During setting, any of the two types of key may be selected, or encryption is separately performed by using the two types of key.

The key herein may be set in multiple manners. For example, the key may be formed by negotiation between the server 100 and the download access node 200 when the distributed storage system 1 is established; or the key may be set for each user that uses the distributed storage system 1, that is, when the user logs in to the distributed storage system 1, marking is performed by using user information used for login, so as to form a key to be used by one user; or the key may be formed for each uploaded file. After the key is formed by negotiation, the download access node 200 performs authentication and authorization on all terminals that access the download access node 200 by using the key. Herein, a generated key may be formed in the foregoing multiple manners by negotiation between the server 100 and the download access node 200, which is not limited herein.

Specifically, referring to FIG. 4, before the acquiring, by a server, download permission that is set, and generating an access control list parameter of the download permission, the method further includes the following step:

S100A. The server acquires a file parameter of the uploaded file, and generates an original download link of the file.

After acquiring the uploaded file, the distributed storage system 1 stores the uploaded file, and also stores the file parameter of the uploaded file, where the file parameter may identify information about the uploaded file, such as a location and a name. After storing of the uploaded file is completed, an original download link that identifies the location is generated according to the file parameter of the uploaded file.

The acquiring, by a server, download permission that is set, and generating an access control list parameter of the download permission includes the following steps:

S101. The server acquires the download permission that is set.

S102. The server generates an access control list according to the download permission.

After acquiring the download permission, the server 100 generates the access control list according to the download permission, and directly identifies download permission existing in the access control list.

S103. The server encrypts the access control list according to a first key agreed on with a download access node, and generates the access control list parameter.

After generating the access control list, the server 100 performs reversible encryption on the access control list according to the first key. Before performing the reversible encryption, the server 100 first performs compression on the generated access control list, and converts the access control list into binary data. After the conversion is completed, according to the first key agreed between the server 100 and the download access node 200, reversible encryption is performed on the binary data formed by means of conversion. The reversible encryption herein refers to performing a logical operation on the binary data according to the first key, and in this way, a person who does not know the key cannot obtain the access control list by parsing. The logical operation used for performing encryption can be performed in an existing manner, which is not described herein again.

After encryption of the access control list is completed, the server 100 performs transcoding on the encrypted access control list, so as to form an access control list parameter applicable to communication.

S104. The server performs a hash operation on the original download link, the access control list parameter, and a second key agreed on with the download access node, and generates a hash value.

The hash value and the original download link are included in the download link.

After transcoding is completed and the access control list parameter is generated, hashing is performed on the access control list parameter and a URI (Uniform Resource Identifier, uniform resource identifier) in the original download link according to a hash algorithm based on the agreed second key. After hashing is performed, a hash value is formed. By using the formed hash value, it may be determined whether the access control list parameter is maliciously modified. The hash algorithm herein generally uses an MD5 (Message Digest Algorithm 5, Content-Digest Algorithm) and an SHA-1 (Secure Hash Algorithm 1, Secure Hash Algorithm). Certainly, the used hash algorithm is not limited to the foregoing two algorithms, and another hash algorithm may also be used to perform hashing according to the original download link, the access control list parameter, and the second key.

In this process, when hashing is performed, an object of the hashing is the URI of the original download link, the access control list parameter, and the second key agreed between the server 100 and the download access node 200. The URI in the object of the hashing may also be changed to another object, for example a URL. Because during hashing, the object of the hashing may be set according to an actual need, the object of the hashing is not limited herein. However, it should be noted that, during download requesting, a domain name may change, or may be based on multiple protocols, for example, an http protocol or an https protocol. These different protocols lead to different URLs. However, in the foregoing case, the URI in the URL generally does not change. Therefore, when a hash operation is performed, the URI, the access control list parameter, and the second key are preferably used as objects.

After generating of the hash value is completed, the server 100 concatenates the original download link, the access control list parameter, and the hash value, so as to form a final download link. When another user performs downloading by using a browser, the final download link released by the user may be copied, and may be pasted in an address box of the browser, so as to access the distributed storage system 1 for downloading a file.

Optionally, the access control list includes at least one control entry, the access control list parameter includes at least one control entry parameter, and one control entry parameter is corresponding to one control entry; and the control entry parameter is formed after the control key is encrypted according to the first key.

The access control list includes the at least one control entry. For example, at least one of a requesting source that is allowed/forbidden to download, a client that that is allowed/forbidden to download, an IP segment that is allowed/forbidden to download, and a validity period for downloading may be included. Certainly, in addition to the control entry provided in the foregoing, another control entry may further be included, and a type of the control entry and a quantity of control entries may be increased or decreased according to an actual need of the user.

After the user completes setting of the download permission, and generates the access control list according to this, the server 100 may split control entries one by one, and form each control entry corresponding to the access control list.

The server 100 performs reversible encryption on each control entry, and generates at least one control entry parameter by means of transcoding.

After the at least one control entry parameter is generated, concatenation is performed in a specified manner so as to form a character string of the at least one control entry parameter. The specified manner may be ascending order, descending order, or another agreed manner, which is not limited herein.

By splitting the access control list beforehand, an entry that is of the download permission and that has not been set by the user may be eliminated. For example, if only a validity period for downloading is set, a control entry parameter corresponding to other download permission does not need to be included in a transmission process, and during authentication, an authentication speed may be further improved.

After reversible encryption of each control entry is completed, the server 100 concatenates the original download link, the at least one control entry parameter, and the hash value to form a download link.

When the download link is sent in step S112, correspondingly, multiple entries may be added to a customized HTTP header of a download request, and each entry is corresponding to a control entry in the access control list. When download requesting is performed, the at least one acquired encrypted control entry is loaded into an HTTP header that is based on the download request, and is sent to the download access node 200 for authentication.

For a key generated by negotiation between the server 100 and the download access node 200, if the same key is used for a long time, there is a higher possibility that the key may be cracked. To further improve security of the key, the method further includes the following step:

S105. When a preset time threshold expires, negotiating, by the server, with the download access node and updating the first key and the second key.

A preset time threshold, for example, a day, a week, or a month is set; the server 100 and the download access node 200 are set to negotiate with each other once again when the preset time threshold expires, so as to update the key; only one of the first key and the second key may be set to be updated during an update, or both the first key and the second key may be set to be updated during an update.

The present invention discloses a file downloading method in a distributed storage system. A server generates an access control list parameter that limits download permission, and publishes the access permission control list parameter together with a download link; and when a terminal sends a download request to a download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

In addition, in the prior art, during authentication, communication needs to be performed between the download access node and the server so as to complete authentication. Therefore, in a communication process, a case in which a network disconnection between the download access node and the server leads to a download exception may occur. In this way, by using the foregoing method of the present invention and by performing authentication directly by using the download access node, a process of communication between the download access node and the server may be eliminated, thereby avoiding a download exception that occurs in a case of a network disconnection, and improving reliability of the distributed storage system.

In addition, when authentication is performed by using the foregoing method, the download access node does not need to temporarily store the access control list parameter, and performs authentication by acquiring the access control list parameter and the download parameter in the download request from the download request; in this way, a memory resource consumed by the download access node is also saved.

A file downloading method corresponding to a server 100 is described above, and the following describes a file downloading method by using a download access node 200 as an example. Referring to FIG. 1, a distributed storage system 1 includes the server 100 and the download access node 200.

Figure 5:
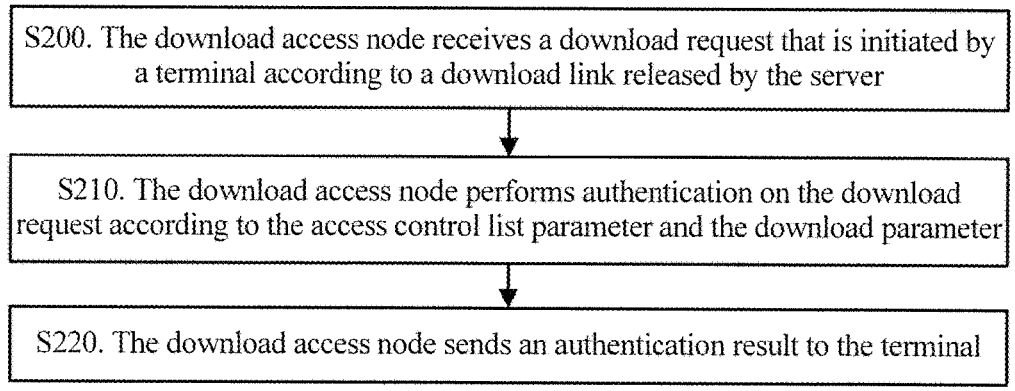
FIG. 5 is a flowchart of a file downloading method of a download access node according to the present invention.

Referring to FIG. 5, the method includes the following steps:

S200. The download access node receives a download request that is initiated by a terminal according to a download link released by the server.

S210. The download access node performs authentication on the download request according to an access control list parameter and a download parameter.

The download link includes the access control list parameter generated by the server 100 according to download permission that is set, and the download request includes the access control list parameter and the download parameter of the terminal.

After receiving the download request, the download access node 200 performs decoding on the download request and acquires, from the download request, the access control list parameter and the download parameter that is about the terminal. Because in the download request, the download parameter is attached to the download request according to the HTTP protocol, and is not encrypted based on a key, the download access node 200 may directly acquire the download parameter. The download parameter further includes information such as a requesting source of the terminal, a used client, an IP segment, and a download time. Because the download request is generated according to the HTTP protocol, for content included in the download request, reference may be made to a download request in the existing HTTP protocol, which is not described herein.

Herein, it should be noted that when the terminal 300 sends a download request, download requesting can be performed by using a browser or can be performed by using a pre-installed client on the terminal 300.

After acquiring the download parameter and an access control list, the download access node 200 performs authentication on the download parameter according to download permission recorded in the access control list.

S220. The download access node sends an authentication result to the terminal.

When the download request meets the download permission, the terminal 300 may download a file; when the download request does not meet the download permission, for example, if the following case occurs: a time limit set by a user is exceeded, a download request is sent by using another website, downloading is performed by using a client in a blacklist, or the like, file downloading cannot be performed.

When the download parameter of the terminal meets all download permission that is set, authentication is performed on the terminal by the download access node 200. In this case, the download access node 200 may acquire an uploaded file stored in a cache server according to an original download link that is of the uploaded file and that is included in the download request, and send the uploaded file to the terminal, so as to complete a process of file downloading.

In this case, the download access node 200 performs decryption and an integrity check on the download request according to a key agreed on with the server 100 beforehand, so as to acquire the access control list included in the download request.

Further, in a process of generating the download link by the server 100, to ensure confidentiality of the access control list parameter, encryption is further performed on the download link. Correspondingly, the download access node 200 also needs to perform decryption and an integrity check on the download request according to a key agreed on with the server 100 beforehand, so as to acquire the access control list included in the download request.

On the download access node 200, a process of performing an integrity check and a process of performing decryption are interchangeable. However, preferably, the process of performing an integrity check is first performed. That is because if the download request has been maliciously modified, even if an access control list is acquired by means of decryption, the access control list cannot be used any more. In this way, first performing an integrity check and then performing decryption may ensure that the download access node 200 can effectively perform authentication on the download request.

Figure 6:
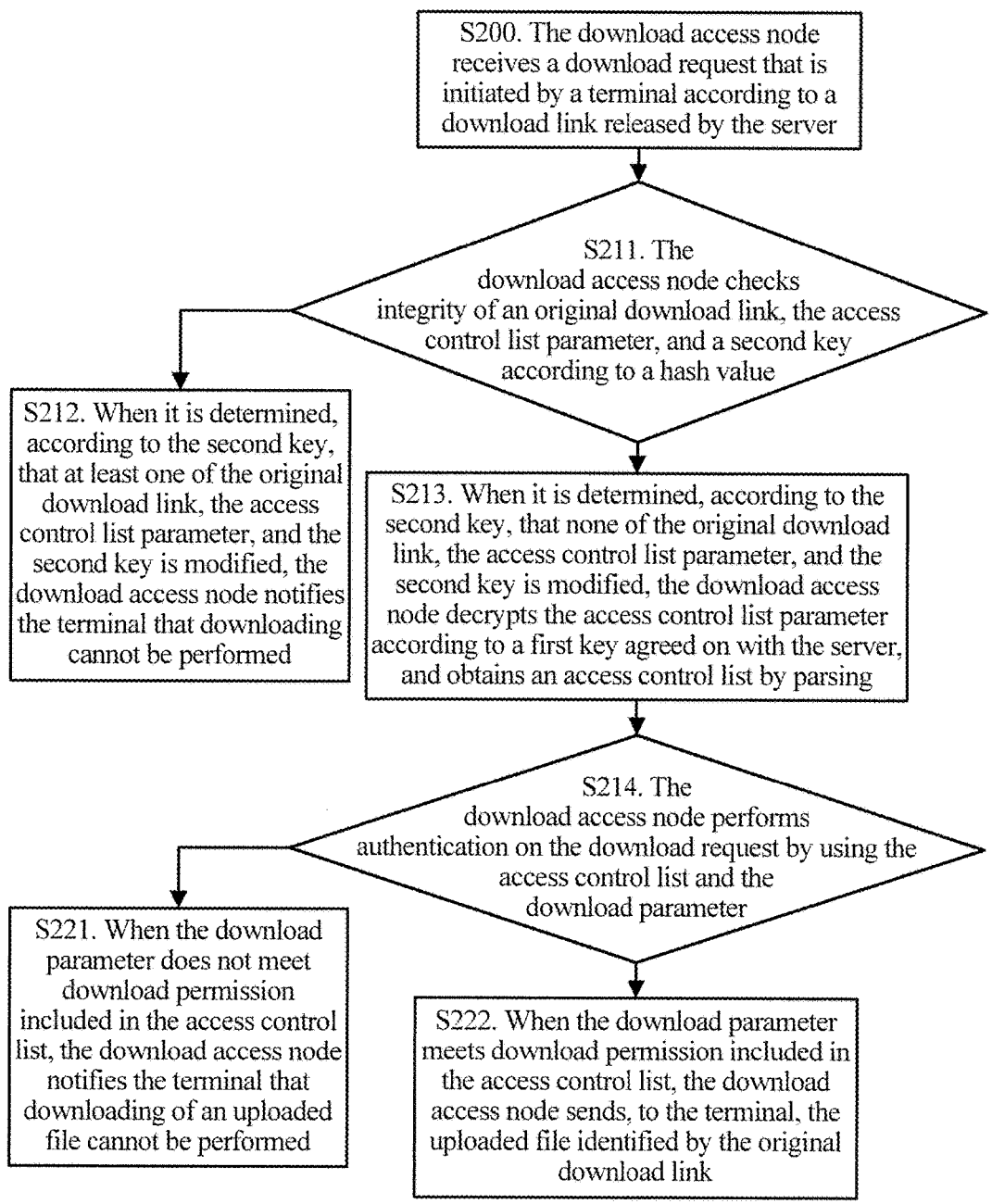
FIG. 6 is a flowchart of another file downloading method of a download access node according to the present invention.

Specifically, referring to FIG. 6, the performing, by the download access node, authentication on the download request according to an access control list parameter and a download parameter includes the following steps:

S211. The download access node checks integrity of an original download link, the access control list parameter, and a second key according to a hash value.

The original download link is generated by the server 100 according to the file parameter of the uploaded file, and the file parameter generally includes related information, such as a location of the uploaded file, a name, and a time. In the distributed storage system, after uploading of the uploaded file is completed, the original download link is directly generated. The hash value is generated by performing a hash operation on the original download link, the access control list parameter, and the second key by using the server 100.

On the download access node 200, the download parameter in the download request is acquired, and parsing is performed on the download request, so as to acquire the original download link, the access control list parameter, and the hash value that are of the download request. The hash value is formed after the server 100 performs a hash operation according to the original download link, the access control list parameter, and the second key, and the hash value is used to determine whether the access control list parameter is maliciously modified by another person. In a process of performing a hash operation, a hash algorithm is used, and an MD5 and an SHA-1 are generally used. Certainly, the used hash algorithm is not limited to the foregoing two algorithms, and another hash algorithm may also be used to perform a hash operation on the original download link, the access control list parameter, and the second key.

Because the hash value is a unique value formed after a hash operation is performed on a URI of the original download link, the access control list parameter, and the second key, when a person modifies any one of the original download link, the access control list parameter, and the second key, the integrity check cannot succeed.

S212. When it is determined, according to the second key, that at least one of the original download link, the access control list parameter, and the second key is modified, the download access node notifies the terminal that downloading cannot be performed.

After the download access node 200 performs a check on the original download link, the access control list parameter, and the second key according to the acquired hash value, a check result is obtained. When at least one of the original download link, the access control list parameter, and the second key is modified, the integrity check cannot succeed. Then, in a case in which the at least one of the original download link, the access control list parameter, and the second key is tampered with, the download access node 200 notifies the terminal that a download process cannot be completed.

S213. When it is determined, according to the second key, that none of the original download link, the access control list parameter, and the second key is modified, the download access node decrypts the access control list parameter according to a first key agreed on with the server, and obtains an access control list by parsing.

When none of the original download link, the access control list parameter, and the second key is modified, the integrity check performed on the download request can succeed. Then, the download access node 200 performs decoding on the access control list parameter, so as to acquire an access control list on which reversible encryption has been performed according to the first key.

The download access node 200 decrypts, according to the first key agreed on with the server 100, the access control list on which the reversible encryption has been performed, which is an inverse operation of a logical operation performed according to the first key. The logical operation herein should be corresponding to a logical operation performed by the server 100. After the inverse operation, data in a binary form in the control list is accessed. In this case, decompression further needs to be performed on the binary data. In this way, an access control list that includes download permission may be acquired.

S214. The download access node performs authentication on the download request by using the access control list and the download parameter.

An authentication process is similar to a process described in step S210, where download parameters are compared one by one according to the download permission limited by the access control list, so as to determine whether a terminal that sends a download request meets the download permission of the uploaded file.

According to the authentication process, the download access node 200 sends an authentication result to the terminal, so as to notify the terminal whether downloading of the uploaded file can be performed. Specifically, the sending, by the download access node, an authentication result to the terminal includes the following step:

S221. When the download parameter does not meet download permission included in the access control list, the download access node notifies the terminal that downloading of the uploaded file cannot be performed;

Alternatively:

S222. When the download parameter meets download permission included in the access control list, the download access node sends, to the terminal, the uploaded file identified by the original download link.

When one entry in the download parameter does not meet the download permission in the access control list, the terminal has no permission to download the uploaded file. In this case, the download access node 200 notifies the terminal that downloading cannot be completed.

If all the download parameters meet the download permission in the access control list, it may be learned that the terminal is allowed to download and can complete downloading. In this case, the download access node 200 may find, according to the original download link, an uploaded file located at the cache server, and forward the uploaded file to the terminal, so that the terminal completes a downloading process.

In addition, the access control list parameter includes at least one control entry parameter. In this way, decryption needs to be performed on control entry parameters one by one, so as to acquire corresponding control entries, and an access control list may be acquired according to these control entries. By splitting the access control list beforehand, an entry that is of the download permission and that has not been set by the user may be eliminated. For example, if only a validity period for downloading is set, a control entry parameter corresponding to other download permission does not need to be included in a transmission process, and during authentication, an authentication speed may be further improved.

It should be noted that, the hash value is formed after the server performs hashing according to the original download link, at least one control entry parameter, and the second key. The download access node 200 performs decoding on each control entry parameter, so as to generate at least one corresponding encrypted control entry. The download access node 200 generates, according to the at least one control entry that has been acquired, an access control list by means of integration.

Because in the download request, the access control list is split into multiple control entries for reversible encryption, the download access node 200 also performs decryption on each encrypted control entry. In this way, at least one control entry in the access control list may be acquired.

In this case, the download link is generated by concatenating the original download link, the at least one control entry parameter, and the hash value, and in a process of splitting the download link, control entry parameters need to be obtained one by one by means of splitting, so as to perform procedures such as an integrity check, decoding, and decryption.

Corresponding to a procedure in the server 100, to further improve security of a key, in a file downloading method performed by the download access node 200, a preset time threshold may further be set, for example, a day, a week, or a month. When the preset time threshold expires, the download access node 200 and the server are set to negotiate with each other once again, so as to update the key, where the key includes at least one of the first key and the second key.

Certainly, the key may further be formed by negotiation in the following manners. The key may be formed by negotiation between the download access node 200 and the server 100 when the distributed storage system 1 is established; or the key may be set for each user that uses the distributed storage system 1, that is, when the user logs in to the distributed storage system 1, user information used for login is recorded, so as to form a key to be used by one user; or the key may be formed for each uploaded file. Herein, a generated key may be formed in the foregoing multiple manners by negotiation between the download access node 200 and the server 100, which is not limited herein.

The present invention discloses a file downloading method. A server generates an access control list parameter that limits download permission, and publishes the access permission control list parameter together with a download link; and when a terminal sends a download request to a download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

To make a person skilled in the art better understand technical solutions of a file downloading method provided in the present invention, the following describes in detail, by using a specific embodiment, the file downloading method provided in the present invention.

Figure 7:
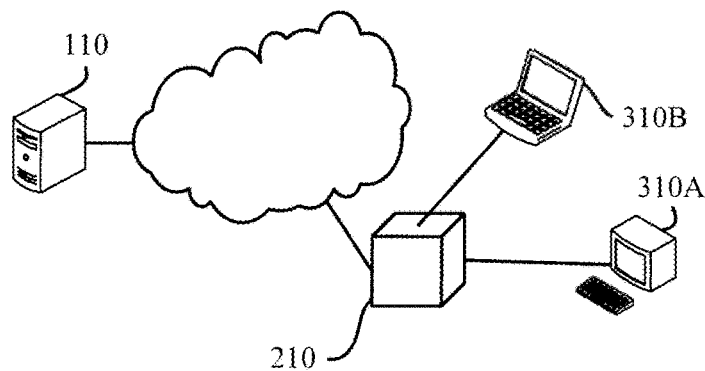
FIG. 7 is a schematic diagram of a structure according to an embodiment of the present invention.

In an embodiment of the present invention, as shown in FIG. 7, a distributed storage system 2 includes a central server 110 and an access node 210; a user accesses the central server by using a browser on a first terminal 310A so as to upload an uploaded file and download permission that is set, and another user performs downloading by using a second terminal 310B.

Figure 8A:
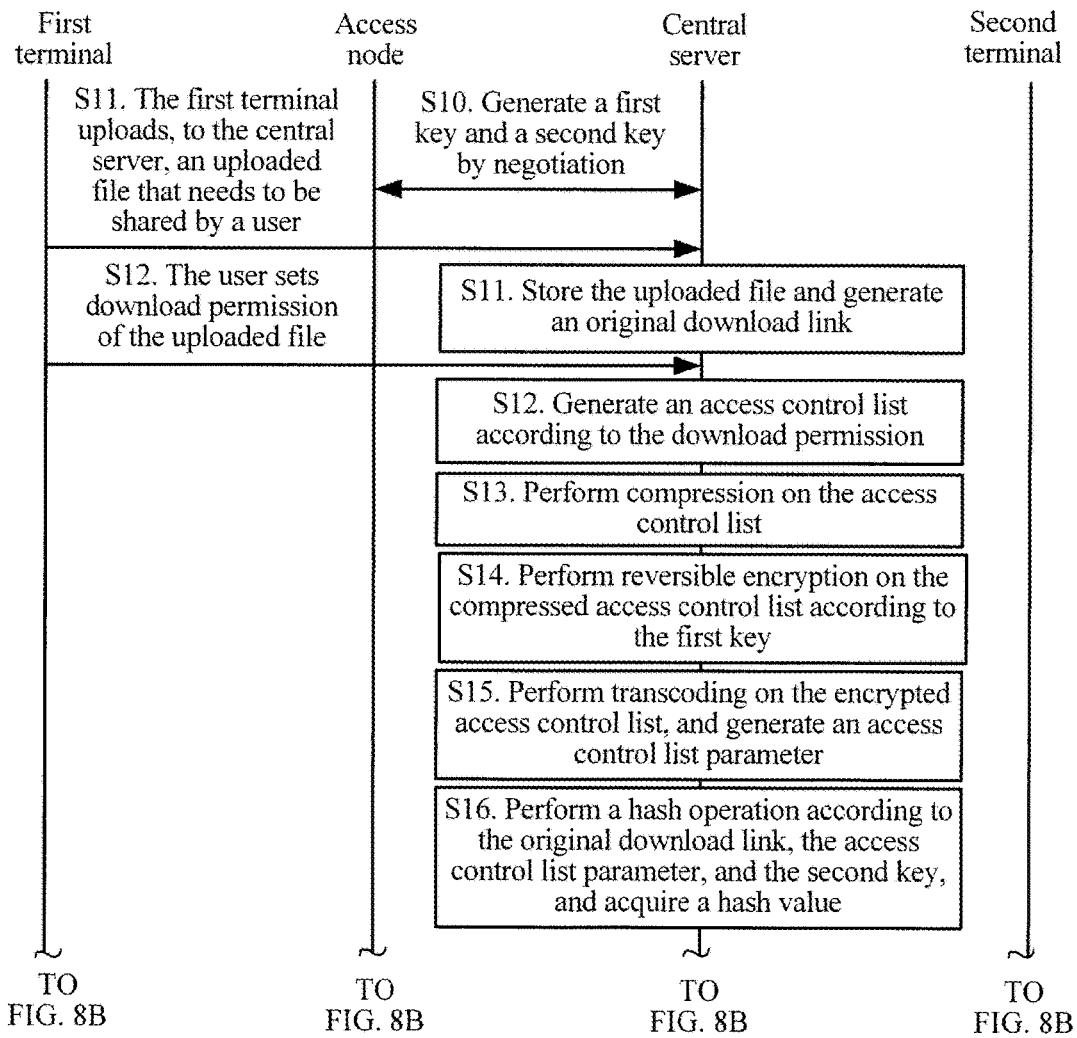
FIG. 8A and FIG. 8B are a flowchart of a file downloading method according to an embodiment of the present invention.
Figure 8B:
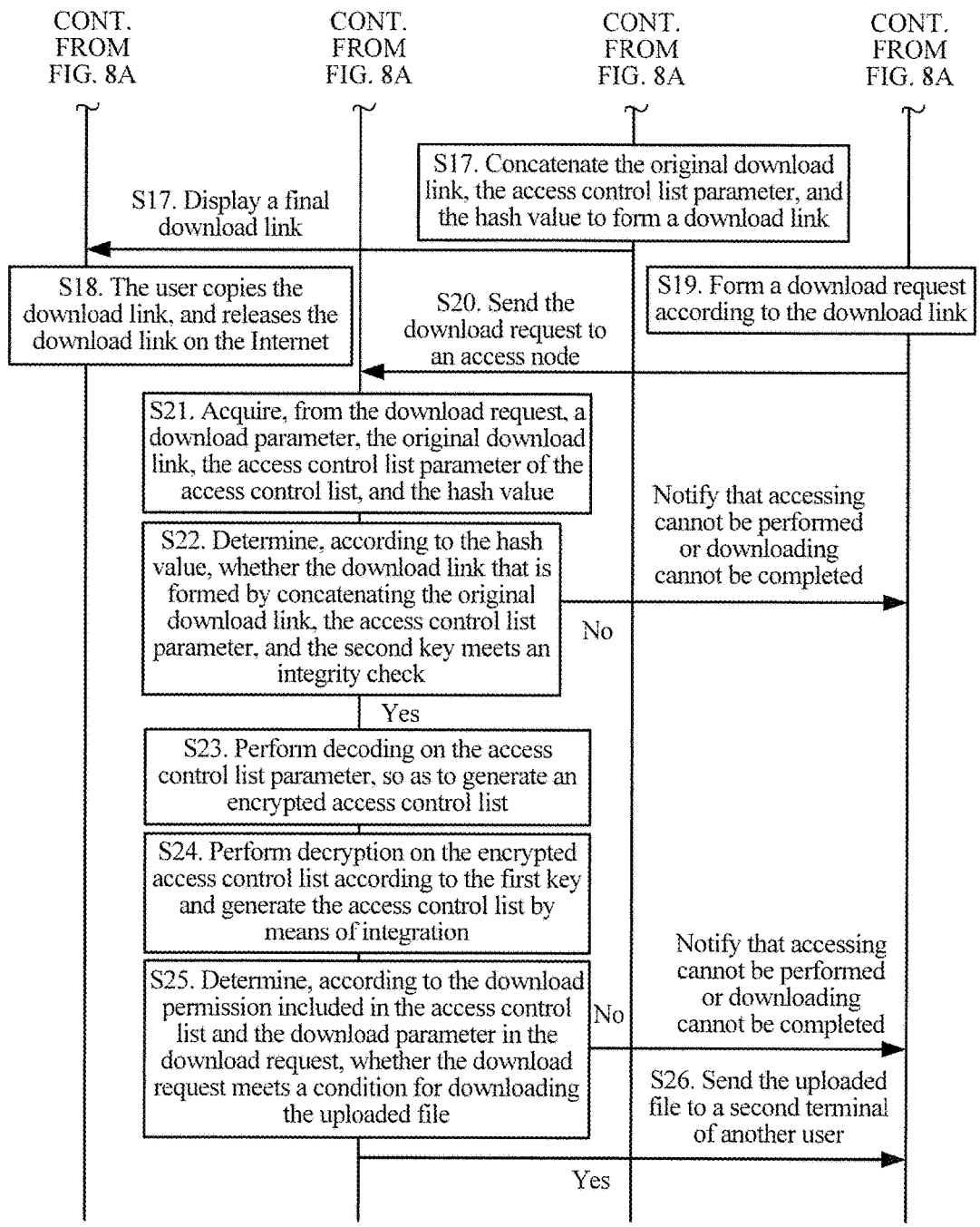

In this embodiment, as shown in FIG. 8A and FIG. 8B, a file downloading method includes the following steps:

S10. The central server and the access node generate a first key and a second key by negotiation.

When the distributed storage system 2 is established, the central server 110 and the access node 210 generate, by negotiation, the first key and the second key that are used for encryption and decryption.

S11. The first terminal uploads, to the central server, an uploaded file that needs to be shared by a user, and the central server stores the uploaded file and generates an original download link.

The user selects, on a page of a browser, a to-be-uploaded file that needs to be uploaded, the selected to-be-uploaded file is uploaded to the access node 210 for storage, a file parameter is generated, and the original download link is generated according to the file parameter of the uploaded file.

S12. The user sets the download permission of the uploaded file, and the central server generates an access control list according to the download permission.

The user sets the download permission by using the terminal 310A, that is, the user sets a blacklist/whitelist of a requesting source, a blacklist/whitelist of a client, a blacklist/whitelist of an IP segment, and a validity period for downloading. The central server 110 acquires the download permission, and generates and stores the access control list according to the download permission.

S13. The central server performs compression on the access control list.

After generating the access control list, the central server 110 performs compression on the access control list so as to generate a binary character string.

S14. The central server performs reversible encryption on the compressed access control list according to the first key.

The central server 110 performs a logical operation according to the first key and the binary character string that is generated after the access control list is compressed, so as to generate an encrypted access control list.

S15. The central server performs transcoding on the encrypted access control list, and generates an access control list parameter.

The central server 110 converts the encrypted access control list into an access control list parameter applicable to communication.

S16. The central server performs a hash operation according to the original download link, the access control list parameter, and the second key, and acquires a hash value.

The central server 110 performs a hash operation on a URI of the original download link, the access control list parameter, and the second key according to an SHA-1 algorithm, and obtains the hash value.

S17. The central server concatenates the original download link, the access control list parameter, and the hash value to form a download link, and displays the download link on the first terminal.

The central server 110 concatenates the generated original download link, the access control list parameter, and the hash value to form the download link, and sends the download link to the first terminal 310A for displaying.

S18. The user copies the download link, and releases the download link on the Internet.

The user copies the download link displayed on the terminal 310A, and releases the download link on the Internet according to a preference of the user.

S19. A second terminal of another user forms a download request according to the download link.

Another user copies, according to the second terminal 310B used by the another user, a download link released on the Internet, pastes the download link in an address box of a browser, and accesses the download link, so as to perform download requesting.

S20. The second terminal sends the download request to the access node.

S21. The access node acquires, from the download request, a download parameter, the original download link, the access control list parameter of the access control list, and the hash value.

The second terminal 310B sends the download request to the access node 210, and the access node 210 acquires the download parameter, the original download link, the access control list parameter, and the hash value from the download request.

The download parameter includes information such as a requesting source of the download request, the IP segment, and a request time.

S22. The access node determines, according to the hash value, whether the download link that is formed by concatenating the original download link, the access control list parameter, and the second key meets an integrity check.

By performing the integrity check, the access node may determine whether the download link has been maliciously modified by a person.

If the integrity check is not met, an error code is returned to the terminal 310B, and the terminal 310B is notified that accessing or completing downloading cannot be performed.

If the integrity check is met, step S23 is performed.

S23. The access node performs decoding on the access control list parameter, so as to generate an encrypted access control list.

S24. The access node performs decryption on the encrypted access control list according to the first key and generates the access control list by means of integration.

After completing the integrity check, the access node 210 performs an inverse operation on the encrypted access control list according to the first key, and generates the access control list that includes the download permission set by the user.

S25. The access node determines, according to the download permission included in the access control list and the download parameter in the download request, whether the download request meets a condition for downloading a file.

The access node 210 compares the download permission with the download parameter; when any one of a requesting source, an IP segment, and a download time that are in the download parameter does not comply with user's setting in the download permission, discards the download request, and returns, to the terminal 310B, a message that authentication fails and downloading cannot be performed.

When all download parameters meet the download permission, step S26 is performed.

S26. The access node requests a file from the central server, and the central server sends, by using the access node, the uploaded file to the second terminal used by the another user.

By performing the foregoing process, sharing and downloading of the uploaded file may be completed. In this embodiment, encryption is performed by using the first key that is set by the central server and the access node, and the integrity check is performed by using the second key. In this way, authentication may be completed by the access node 200, and there is no need to perform authentication on the download request by using the central server, which improves an authentication speed and a speed of downloading a file.

Figure 9A:
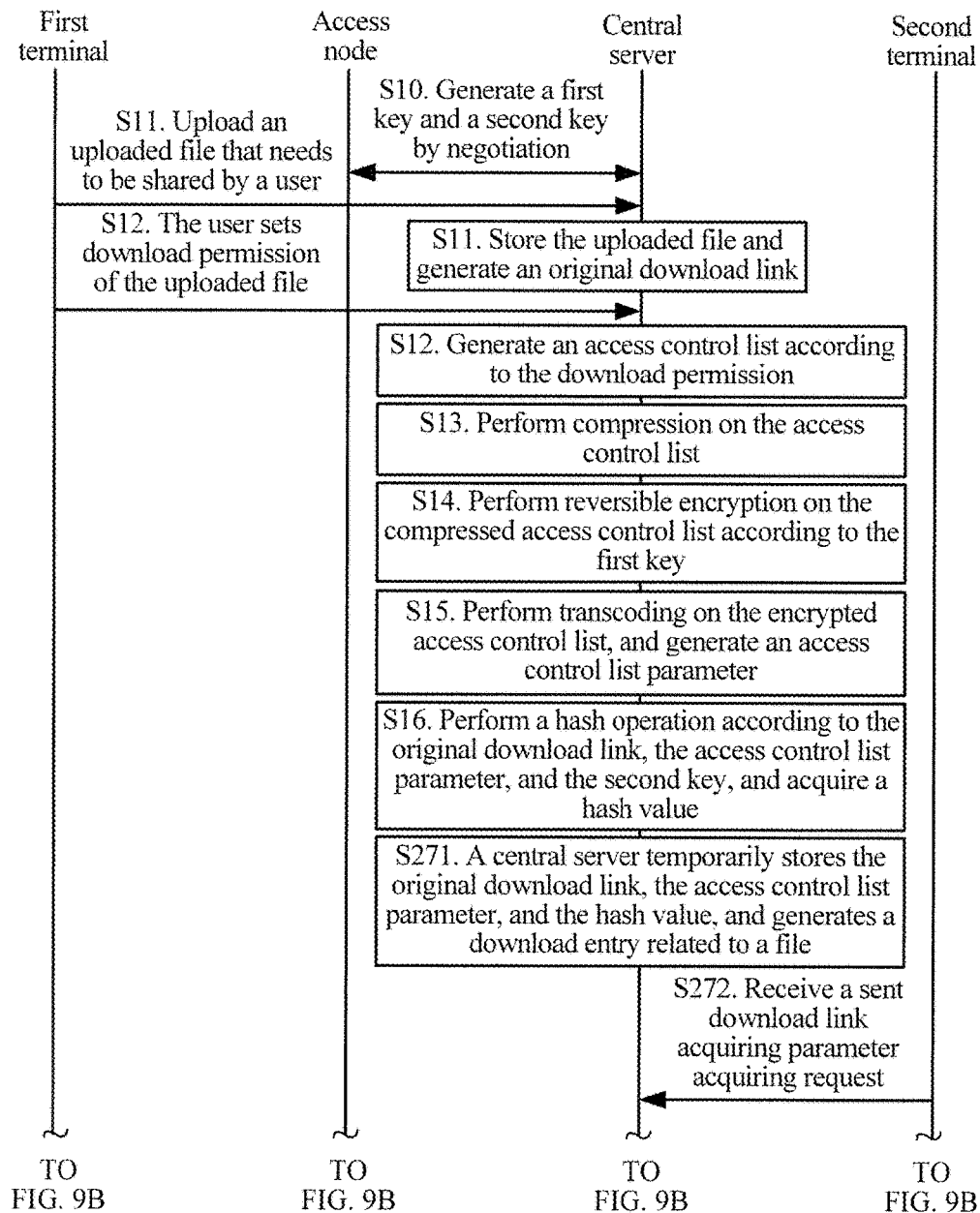
FIG. 9A and FIG. 9B are a flowchart of another file downloading method according to an embodiment of the present invention.
Figure 9B:
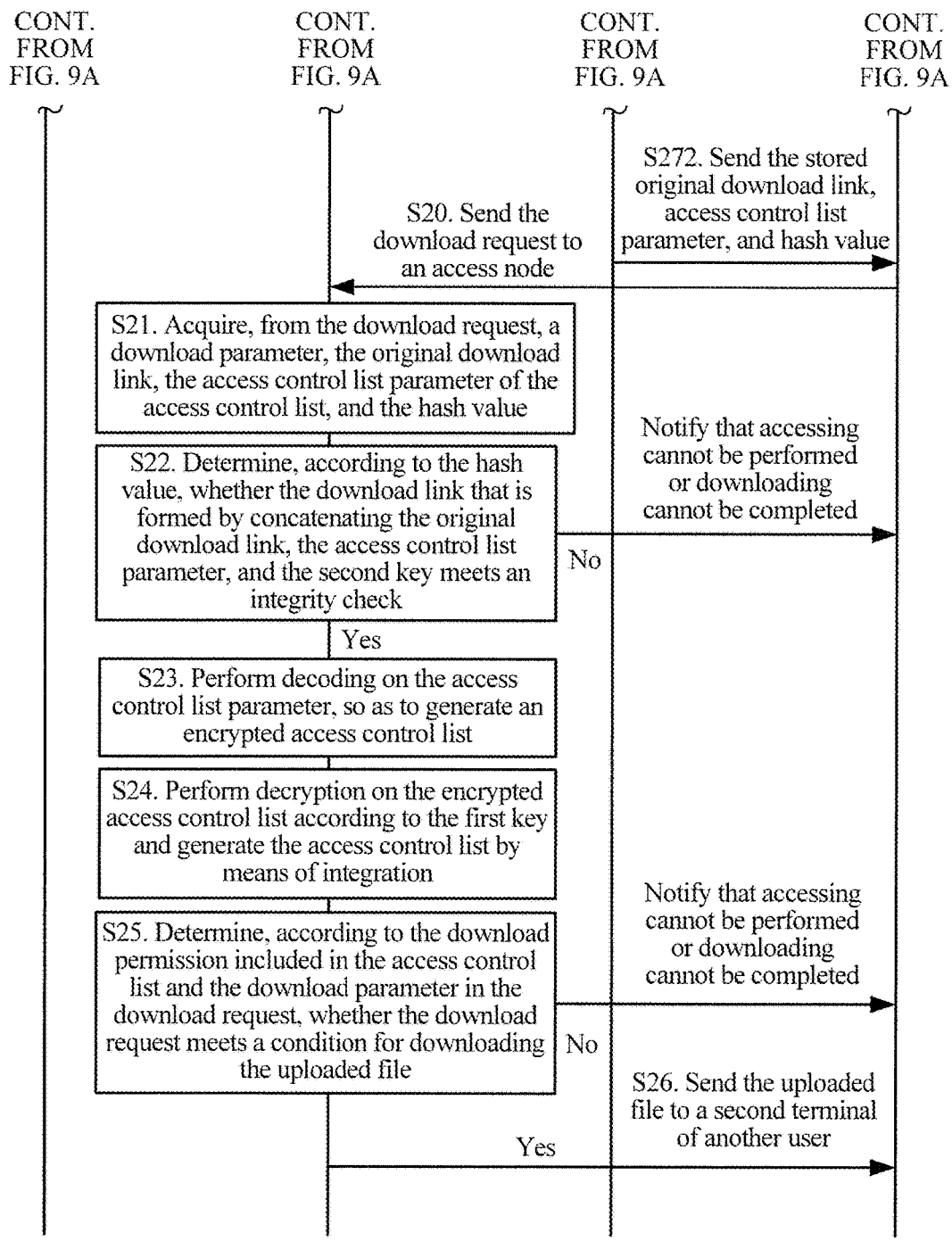

Optionally, releasing of the original download link, the access control list parameter, and the hash value by the central server 110 can be performed without a need to perform step S17, step S18, or step S19, and after step S16, as shown in FIG. 9A and FIG. 9B, the method further includes the following steps:

S271. The central server temporarily stores the original download link, the access control list parameter, and the hash value, and generates a download entry related to a file.

The central server 110 generates, on a web page corresponding to the distributed storage system 2, a download entry about an uploaded file, and establishes an association between the download entry and the original download link, an association between the download entry and the access control list parameter, and an association between the download entry and the hash value.

When the another user selects the download entry according to the page, a client on the terminal 310E sends a download link acquiring request to the central server.

S272. The central server receives the download link acquiring request sent by the second terminal of the another user, and sends the stored original download link, access control list parameter, and hash value to the terminal of the another user.

For the access node 210, because the second terminal 310B separately receives the original download link, the access control list parameter, and the hash value, the user does not need to release the download link on the Internet. In addition, when a file is needs to be downloaded by using a client, both the access control list parameter and the hash value are set on the header of the download request of the HTTP protocol, and the header of the download request may be customized according to a need. Then, more control entries may be added to the access control list so as to diversify settings of the download permission.

Figure 10A:
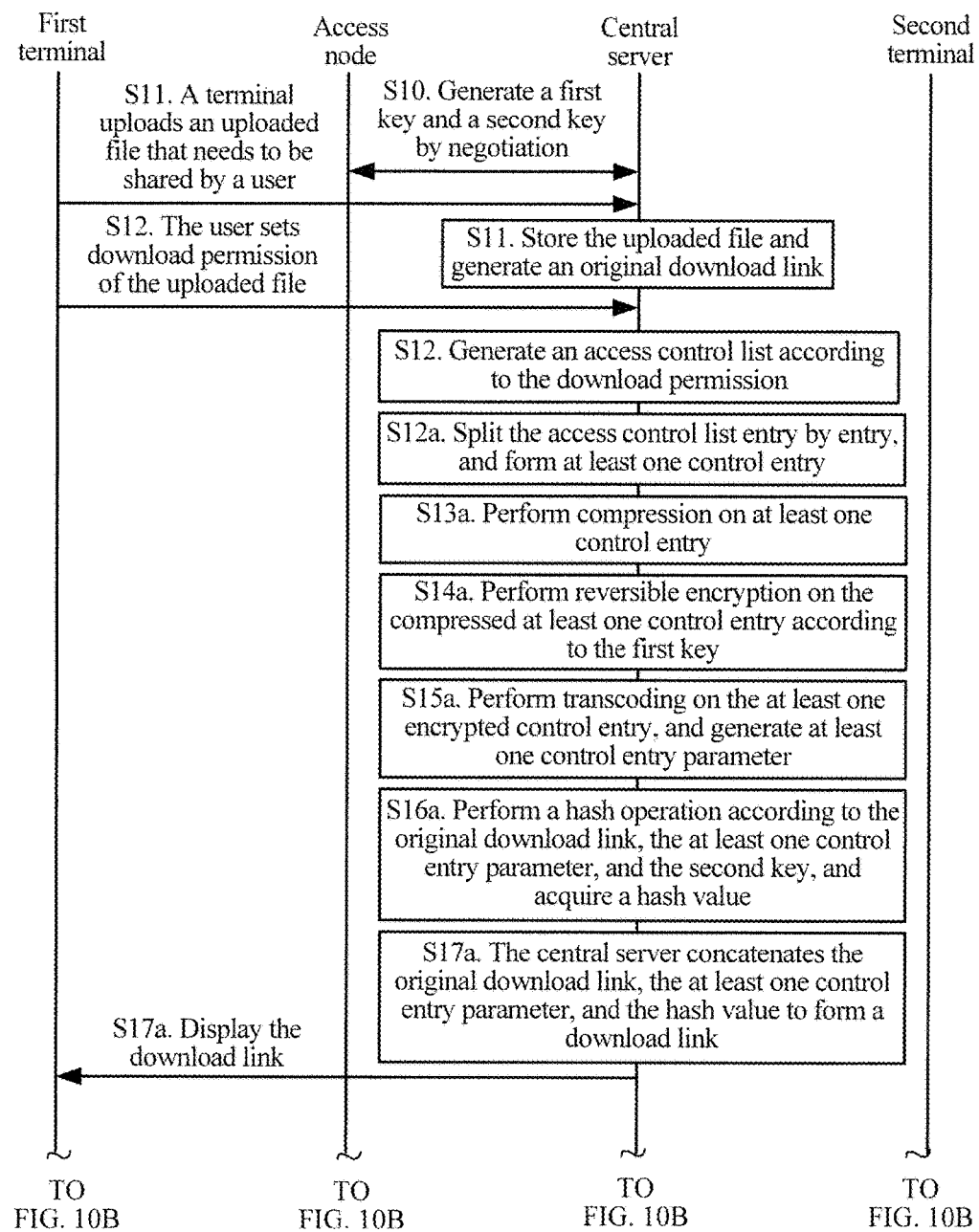
FIG. 10A and FIG. 10B are a flowchart of another file downloading method according to an embodiment of the present invention.
Figure 10B:
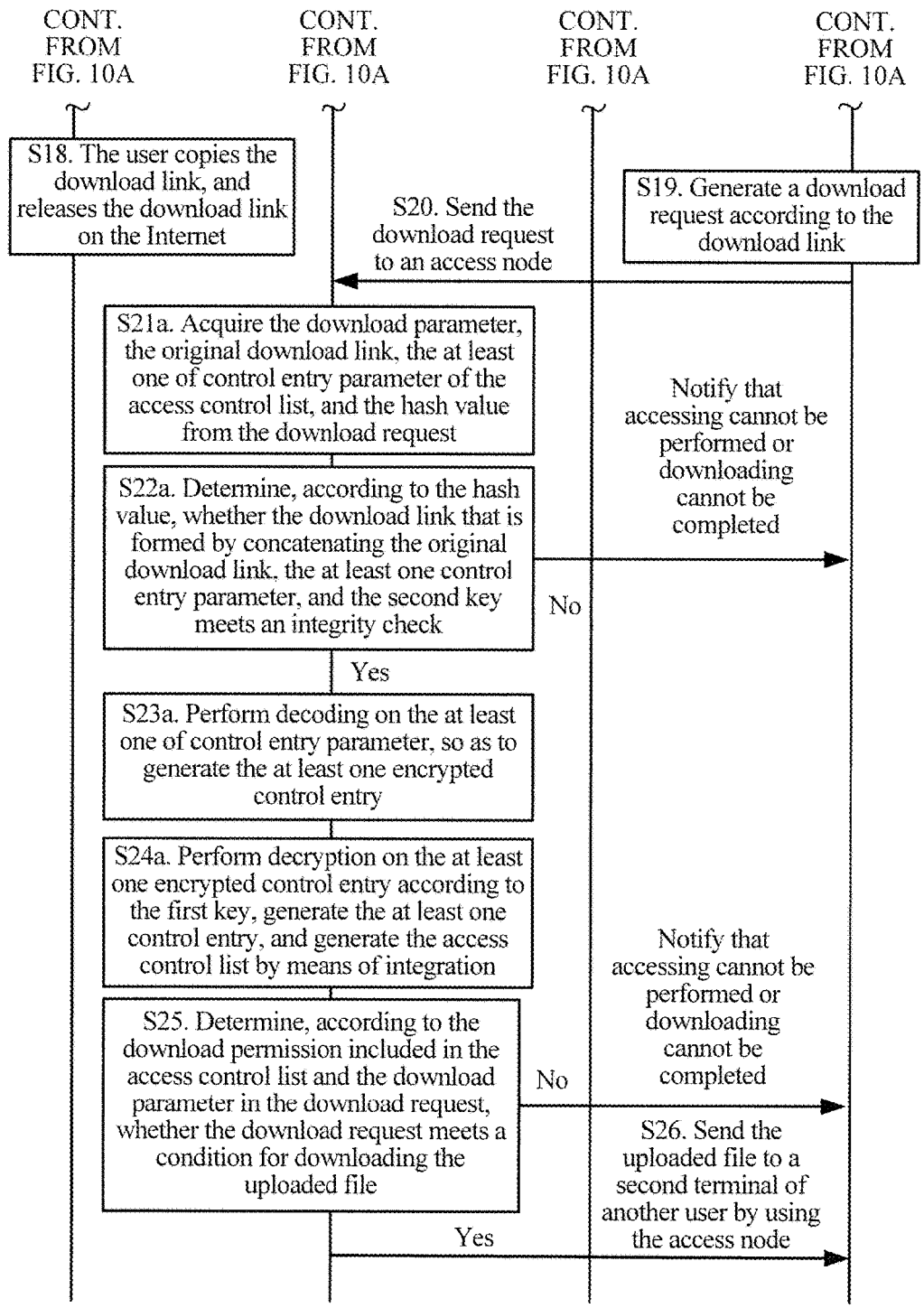

In an embodiment of the present invention, an access control list includes at least one control entry. Referring to FIG. 10A and FIG. 10B, another method of a distributed storage system 2 includes the following steps:

S10. A central server and an access node generate a first key and a second key by negotiation.

When the distributed storage system 2 is established, the central server 110 and the access node 210 generate, by negotiation, the first key and the second key that are used for encryption and decryption.

S11. A first terminal uploads, to the central server, an uploaded file that needs to be shared by a user, and the central server stores the uploaded file and generates an original download link.

The user selects, on a page of a browser, a to-be-uploaded file that needs to be uploaded, the selected to-be-uploaded file is uploaded to the access node 210 for storage, a file parameter is generated, and the original download link is generated according to the file parameter of the uploaded file.

S12. The user sets download permission of the uploaded file, and the central server generates an access control list according to the download permission.

The user sets the download permission by using a terminal 310A, that is, the user sets a blacklist/whitelist of a requesting source, a blacklist/whitelist of a client, a blacklist/whitelist of an IP segment, and a validity period for downloading. The central server 110 acquires the download permission, and generates and stores the access control list according to the download permission.

S12a. The central server splits the access control list entry by entry, and forms at least one control entry, where the one control entry is corresponding to a type of download permission; for example, if the one control entry is a blacklist/whitelist of a requesting source, the control entry is corresponding to the download permission that is about the requesting source and set by the user.

Corresponding steps S13 to S17 performed by the central server 110 are respectively specifically the following steps:

S13a. The central server performs compression on at least one control entry.

S14a. The central server performs reversible encryption on the at least one compressed control entry according to the first key.

S15a. The central server performs transcoding on the at least one encrypted control entry, and generates at least one control entry parameter.

S16a. The central server performs a hash operation according to the original download link, the at least one control entry parameter, and the second key, and acquires a hash value.

S17a. The central server concatenates the original download link, the at least one control entry parameter, and the hash value to form a download link, and displays the download link on the first terminal.

S18. The user copies the download link, and releases the download link on the Internet.

The user copies the download link displayed on the terminal 310A, and releases the download link on the Internet according to a preference of the user.

S19. A second terminal of another user forms a download request according to the download link.

Another user copies, according to the second terminal 310B used by the another user, a download link released on the Internet, pastes the download link in an address box of a browser, and accesses the download link, so as to perform download requesting.

S20. The second terminal sends the download request to the access node.

Corresponding steps S22 to S25 performed by the access node 210 are specifically the following steps:

S21a. The access node acquires a download parameter, the original download link, the at least one control entry parameter of the access control list, and the hash value from the download request.

S22a. The access node determines, according to the hash value, whether the download link that is formed by concatenating the original download link, the at least one control entry parameter, and the second key meets an integrity check.

If the integrity check is not met, an error code is returned to the terminal 310B, and the terminal 310B is notified that accessing or completing downloading cannot be performed.

If the integrity check is met, step S24a is performed.

S23a. The access node performs decoding on the at least one control entry parameter, so as to generate the at least one encrypted control entry.

S24a. The access node performs decryption on the at least one encrypted control entry according to the first key, generates the at least one control entry, and generates the access control list by means of integration.

After completing the integrity check, the access node 210 performs an inverse operation on the at least one encrypted control entry according to the first key, generates the at least one control entry, and performs integration on the at least one control entry to form the access control list that includes the download permission set by the user.

In the foregoing manner, an entry that is of the download permission and that has not been set by the user may be eliminated. For example, if only a validity period for downloading is set, a control entry parameter corresponding to other download permission does not need to be included in a transmission process, and during authentication, an authentication speed may be further improved.

Figure 11:
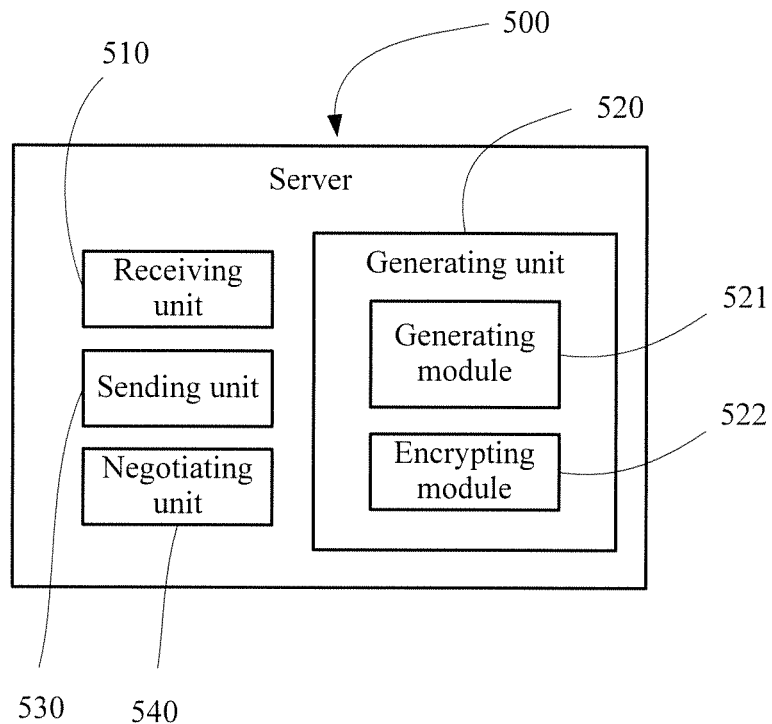
FIG. 11 is a schematic diagram of a structure of a server according to the present invention.

In this embodiment, optionally, the central server 110 may not concatenate and publish the original download link, the at least one control entry parameter, and the hash value, that is, there is no need to perform step S17a, step S18, or step S19, and after step S16, as shown in FIG. 11, the method further includes the following steps:

S271a. The central server temporarily stores the original download link, the at least one control entry parameter, and the hash value, and generates a download entry related to a file.

S272b. The central server receives the download link acquiring request sent by the terminal, and sends the stored original download link, at least one control entry parameter, and hash value to the second terminal of the another user.

S25. The access node determines, according to the download permission included in the access control list and the download parameter in the download request, whether the download request meets a condition for downloading a file.

The access node 210 compares the download permission with the download parameter; when any one of a requesting source, an IP segment, and a download time that are in the download parameter does not comply with user's setting in the download permission, discards the download request, and returns, to the terminal 310B, a message that authentication fails and downloading cannot be performed.

When all download parameters meet the download permission, step S26 is performed.

S26. The access node sends the uploaded file to the second terminal used by the another user.

By performing the foregoing process, sharing and downloading of the uploaded file may be completed. In this embodiment, encryption is performed by using the first key that is set by the central server and the access node, and the integrity check is performed by using the second key. In this way, authentication may be completed by the access node 200, and there is no need to perform authentication on the download request by using the central server, which improves an authentication speed and a speed of downloading a file.

By splitting the access control list beforehand, an entry that is of the download permission and that has not been set by the user may be eliminated. For example, if only a validity period for downloading is set, a control entry parameter corresponding to other download permission does not need to be included in a transmission process, and during authentication, an authentication speed may be further improved.

In the foregoing embodiment, after a first key and a second are generated, a preset time threshold may further be set. In a case in which timing in a distributed storage system reaches the preset time threshold, a central server negotiates with an access node or a CDN once again, so as to update the first key and the second key.

In addition, according to different users, different first keys and second keys may be generated for each user by negotiation.

Corresponding to one of the foregoing file downloading methods the present invention further discloses a central server and a download access node.

Referring to FIG. 11, a server 500 applied to a distributed storage system includes:

a receiving unit 510, configured to acquire download permission that is set;

a generating unit 520, configured to generate an access control list parameter according to the download permission; and a sending unit 530, configured to release a download link that includes the access control list parameter, so that a terminal acquires the download link and generates a download request that includes the access control list parameter.

Optionally, the receiving unit 510 is further configured to acquire a file parameter of an uploaded file; and the generating unit 520 includes:

a generating module 521, configured to generate an access control list according to the download permission, and generate an original download link of the uploaded file according to the file parameter of the uploaded file; and an encrypting module 522, configured to encrypt the access control list according to a first key agreed on with a download access node, and form the access control list parameter; and perform a hash operation on the original download link, the access control list parameter, and a second key agreed on with the download access node, and generate a hash value, where the hash value and the original download link are included in the download link.

Optionally, the access control list includes at least one control entry, the access control list parameter includes at least one control entry parameter, and one control entry parameter is corresponding to one control entry; and the control entry parameter is formed after reversible the control key is encrypted according to the first key.

Optionally, the server 500 further includes a negotiating unit 540; where the negotiating unit 540 is configured to: when a preset time threshold expires, negotiating with the download access node and updating the first key and the second key.

Optionally, the receiving unit 510 is further configured to acquire user information used when a file is uploaded; and the negotiating unit 540 is further configured to, according to the user information, negotiate with the download access node, and generate at least one of the first key and the second key for a user.

Optionally, the receiving unit 510 is further configured to receive a download link acquiring request from the terminal; and the sending unit 530 is specifically configured to send the download link to the terminal.

The present invention discloses a server. The server generates an access control list parameter that limits download permission, and publishes the access permission control list parameter together with a download link; and when a terminal sends a download request to a download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

Correspondingly, the present invention further discloses a download access node applied to a distributed storage system, and the distributed storage system further includes a server.

Referring to FIG. 11, the download access node 600 includes:

a receiving unit 610, configured to receive a download request that is initiated by a terminal according to a download link released by the server, where the download link includes an access control list parameter generated by the server according to download permission that is set, and the download request includes the access control list parameter and a download parameter of the terminal;

an authentication unit 620, configured to perform authentication on the download request according to the access control list parameter and the download parameter; and a sending unit 630, configured to send an authentication result to the terminal.

Optionally, the authentication unit 620 includes a decrypting module 621 and an authentication module 622, where the decrypting module 621 is configured to: check integrity of an original download link, the access control list parameter, and a second key according to a hash value, where the original download link is generated by the server according to a file parameter of an uploaded file, and the hash value is generated by the server by performing a hash operation on the original download link, the access control list parameter, and the second key; and decrypt the access control list parameter according to a first key agreed on with the server, and obtain an access control list by parsing;

the sending unit 630 is further configured to: when it is determined, according to the second key, that at least one of the original download link, the access control list parameter, and the second key is modified, notify the terminal that downloading cannot be performed; or when it is determined, according to the second key, that none of the original download link, the access control list parameter, and the second key is modified, the download access node decrypts the access control list parameter according to the first key agreed on with the server, and obtains the access control list by parsing; and the authentication module 622 is configured to perform authentication on the download request by using the access control list and the download parameter.

Optionally, the sending unit 630 is further configured to: when the download parameter does not meet download permission included in the access control list, notify the terminal that downloading of the uploaded file cannot be performed; or when the download parameter meets download permission included in the access control list, send, to the terminal, the uploaded file identified by the original download link.

The present invention discloses a download access node. A server generates an access control list parameter that limits download permission, and publishes the access permission control list parameter together with a download link; and when a terminal sends a download request to the download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

The present invention further discloses a distributed storage system, including the foregoing server 500 and the foregoing download access node 600.

The present invention discloses a server. The server generates an access control list parameter that limits download permission, and publishes the access permission control list parameter together with a download link; and when a terminal sends a download request to a download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

Figure 12:
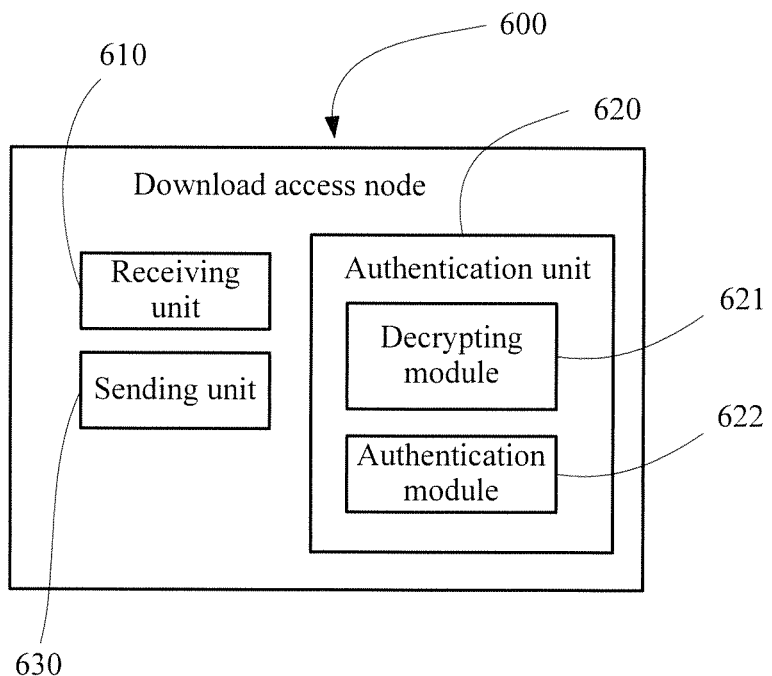
FIG. 12 is a schematic diagram of a structure of a download access node according to the present invention.

Referring to FIG. 12, a server applied to a distributed storage system includes a receiver, a processor, and a transmitter, where the receiver is configured to acquire download permission that is set;

the processor is configured to generate an access control list parameter according to the download permission; and the transmitter is configured to release a download link that includes the access control list parameter, so that a terminal acquires the download link and generates a download request that includes the access control list parameter.

Optionally, the receiver is further configured to acquire a file parameter of an uploaded file; and the processor is specifically configured to: generate an access control list according to the download permission; generate an original download link of the file according to the file parameter of the uploaded file; encrypt the access control list according to a first key agreed on with a download access node, and form the access control list parameter; and perform a hash operation on the original download link, the access control list parameter, and a second key agreed on with the download access node, and generate a hash value, where the hash value and the original download link are included in the download link.

Optionally, the access control list includes at least one control entry, the access control list parameter includes at least one control entry parameter, and one control entry parameter is corresponding to one control entry; and the control entry parameter is formed after the control key is encrypted according to the first key.

Optionally, the processor is further configured to: when a preset time threshold expires, negotiate with the download access node by using the transmitter and the receiver and update the first key and the second key.

Optionally, the receiver is further configured to acquire user information used when a file is uploaded; and the processor is further configured to, according to the user information, negotiate with the download access node by using the transmitter and the receiver, and generate at least one of the first key and the second key for a user.

Optionally, the receiver is further configured to receive a download link acquiring request from the terminal; and the transmitter is specifically configured to send the download link to the terminal.

The present invention discloses a server. The server generates an access control list parameter that limits download permission, and publishes the access permission control list parameter together with a download link; and when a terminal sends a download request to a download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

Figure 13:
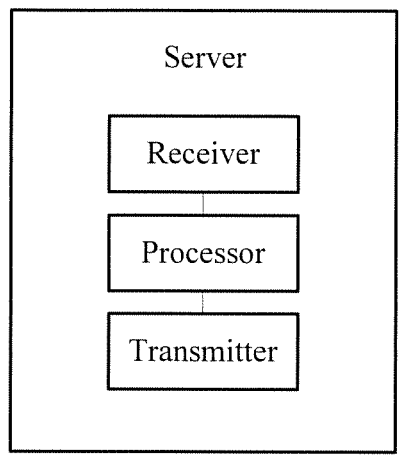
FIG. 13 is a schematic diagram of a server according to the present invention.
Figure 14:
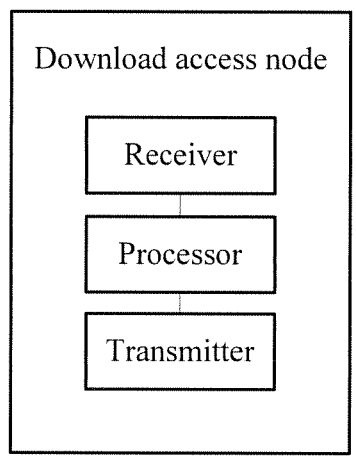
FIG. 14 is a schematic diagram of a download access node according to the present invention.

Referring to FIG. 13, the present invention further discloses a download access node applied to a distributed storage system, including a receiver, a processor, and a transmitter, where the receiver is configured to receive a download request that is initiated by a terminal according to a download link released by a server, where the download link includes an access control list parameter generated by the server according to download permission that is set, and the download request includes the access control list parameter and a download parameter of the terminal;

the processor is configured to perform authentication on the download request according to the access control list parameter and the download parameter; and the transmitter is configured to send an authentication result to the terminal.

Optionally, the processor is specifically configured to: check integrity of an original download link, the access control list parameter, and a second key according to a hash value, where the original download link is generated by the server according to a file parameter of an uploaded file, and the hash value is generated by the server by performing a hash operation on the original download link, the access control list parameter, and the second key; and decrypt the access control list parameter according to a first key agreed on with the server, and obtain an access control list by parsing;

the transmitter is further configured to: when it is determined, according to the second key, that at least one of the original download link, the access control list parameter, and the second key is modified, notify the terminal that downloading cannot be performed; or when it is determined, according to the second key, that none of the original download link, the access control list parameter, and the second key is modified, the download access node decrypts the access control list parameter according to the first key agreed on with the server, and obtains the access control list by parsing; and the processor is further configured to perform authentication on the download request by using the access control list and the download parameter.

Optionally, the transmitter is further configured to: when the download parameter does not meet download permission included in the access control list, notify the terminal that downloading of the uploaded file cannot be performed; or when the download parameter meets download permission included in the access control list, send, to the terminal, the uploaded file identified by the original download link.

The present invention discloses a download access node. A server generates an access control list parameter that limits download permission, and publishes the access permission control list parameter together with a download link; and when a terminal sends a download request to the download access node according to the download link, attaches the acquired access permission control list parameter to the download request. In this way, the download access node may perform authentication on the download request according to the access control list parameter in the download request and a download parameter, and notify the terminal of an authentication result, thereby reducing load on the server, improving an authentication speed, and improving a response speed for downloading a file.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A file downloading method, comprising:
   acquiring, by a server, a file parameter of an uploaded file;
   generating, by the server, an original download link of the uploaded file according to the file parameter of the uploaded file;
   acquiring, by the server, a predetermined download permission;
   generating, by the server, an access control list according to the download permission;
   encrypting, by the server, the access control list according to a first key agreed on with a download access node, and generating an access control list parameter;
   performing, by the server, a hash operation on the original download link, the access control list parameter, and a second key agreed on with the download access node, and generating a hash value; and
   releasing, by the server, a download link that comprises the hash value, the original download link, and the access control list parameter, wherein the download link, when acquired by a terminal, enables the terminal to generate a download request that comprises the access control list parameter.

2. The method according to claim 1, wherein:
   the access control list comprises at least one control entry, the access control list parameter comprises at least one control entry parameter, and one control entry parameter corresponds to one control entry; and
   the at least one control entry parameter is formed after the at least one control key is encrypted according to the first key.

3. The method according to claim 1, further comprising:
   when a preset time threshold expires, negotiating, by the server, with the download access node and updating the first key and the second key.

4. The method according to claim 1, wherein before acquiring, by the server, the file parameter of the uploaded file, the method further comprises:
   acquiring, by the server, user information used when a file is uploaded; and
   according to the user information, negotiating by the server with the download access node, and generating at least one of the first key and the second key for a user.

5. The method according to claim 1, wherein releasing, by the server, the download link comprises:
   receiving, by the server, a download link acquiring request from the terminal; and
   sending, by the server, the download link to the terminal.

6. A file downloading method, comprising:
   receiving, by a download access node, a download request that is initiated by a terminal according to a download link released by a server, wherein the download link comprises an access control list parameter generated by the server according to a predetermined download permission, and the download request comprises the access control list parameter and a download parameter of the terminal;
   checking, by the download access node, integrity of an original download link, the access control list parameter, and a second key according to a hash value, wherein the original download link is generated by the server according to a file parameter of an uploaded file, and the hash value is generated by the server by performing a hash operation on the original download link, the access control list parameter, and the second key;
   when it is determined, according to the second key, that none of the original download link, the access control list parameter, and the second key is modified, decrypting, by the download access node, the access control list parameter according to a first key agreed on with the server, and obtaining an access control list by parsing;
   performing, by the download access node, authentication on the download request using the access control list parameter and the download parameter; and sending, by the download access node, an authentication result to the terminal.

7. The method according to claim 6, further comprising:
when it is determined, according to the second key, that at least one of the original download link, the access control list parameter, and the second key is modified, notifying, by the download access node, the terminal that downloading cannot be performed.

8. The method according to claim 7, wherein sending, by the download access node, the authentication result to the terminal comprises:
when the download parameter does not meet download permission comprised in the access control list, notifying, by the download access node, the terminal that downloading of the uploaded file cannot be performed; or
when the download parameter meets download permission comprised in the access control list, sending, by the download access node to the terminal, the uploaded file identified by the original download link.

9. A server applied to a distributed storage system, the server comprising:
a receiver configured to:
acquire a file parameter of an uploaded file; and
acquire a predetermined download permission;
a processor configured to:
generate an access control list according to the download permission;
generate an original download link of the uploaded file according to the file parameter of the uploaded file;
encrypt the access control list according to a first key agreed on with a download access node, and generate an access control list parameter; and
perform a hash operation on the original download link, the access control list parameter, and a second key agreed on with the download access node, and generate a hash value; and
a transmitter configured to release a download link that comprises the hash value, the original download link, and the access control list parameter, wherein the download link, when acquired by a terminal, enables the terminal to generate a download request that comprises the access control list parameter.

10. The server according to claim 9, wherein:
the access control list comprises at least one control entry, the access control list parameter comprises at least one control entry parameter, and one control entry parameter is corresponds to one control entry; and
the at least one control entry parameter is formed after the at least one control key is encrypted according to the first key.

11. The server according to claim 9, wherein the processor is further configured to: when a preset time threshold expires, negotiate with the download access node using the transmitter and the receiver and update the first key and the second key.

12. The server according to claim 11, wherein:
the receiver is further configured to acquire user information used when a file is uploaded; and the processor is further configured to, according to the user information, negotiate with the download access node using the transmitter and the receiver, and generate at least one of the first key and the second key for a user.

13. The server according to claim 9, wherein:
the receiver is further configured to receive a download link acquiring request from the terminal; and
the transmitter is configured to send the download link to the terminal.

14. A download access node applied to a distributed storage system, the download access node comprising:
a receiver configured to receive a download request that is initiated by a terminal according to a download link released by a server, wherein the download link comprises an access control list parameter generated by the server according to a predetermined download permission, and the download request comprises the access control list parameter and a download parameter of the terminal;
a processor configured to:
check integrity of an original download link, the access control list parameter, and a second key according to a hash value, wherein the original download link is generated by the server according to a file parameter of an uploaded file, and the hash value is generated by the server by performing a hash operation on the original download link, the access control list parameter, and the second key;
when it is determined, according to the second key, that none of the original download link, the access control list parameter, and the second key is modified, decrypt the access control list parameter according to a first key agreed on with the server, and obtain an access control list by parsing; and
perform authentication on the download request using the access control list parameter and the download parameter; and
a transmitter configured to send an authentication result to the terminal.

15. The download access node according to claim 14, wherein:
the transmitter is further configured to:
when it is determined, according to the second key, that at least one of the original download link, the access control list parameter, and the second key is modified, notify the terminal that downloading cannot be performed.

16. The download access node according to claim 15, wherein the transmitter is further configured to:
when the download parameter does not meet download permission comprised in the access control list, notify the terminal that downloading of the uploaded file cannot be performed; or when the download parameter meets download permission comprised in the access control list, send, to the terminal, the uploaded file identified by the original download link.

* * * * *